(12) United States Patent
Wooten

(10) Patent No.: US 7,577,622 B1
(45) Date of Patent: Aug. 18, 2009

(54) METHOD, APPARATUS AND MEDIUM FOR DATA MANAGEMENT COLLABORATION IN THE TRANSPORT OF GOODS

(76) Inventor: Van C. Wooten, 1706 Tealwood La., Corinth, TX (US) 76210

( * ) Notice: Subject to any disclaimer, the term of this patent is extended or adjusted under 35 U.S.C. 154(b) by 521 days.

(21) Appl. No.: 10/858,332

(22) Filed: Jun. 1, 2004

(51) Int. Cl.
*G06F 17/00* (2006.01)

(52) U.S. Cl. .......................................... 705/500; 705/26

(58) Field of Classification Search .................. 705/26, 705/9, 500; 709/209
See application file for complete search history.

(56) References Cited

U.S. PATENT DOCUMENTS

| | | | | |
|---|---|---|---|---|
| 5,377,353 | A * | 12/1994 | Yamaguchi | 711/147 |
| 5,509,118 | A * | 4/1996 | Tuulos et al. | 714/16 |
| 5,752,055 | A * | 5/1998 | Redpath et al. | 715/210 |
| 5,910,896 | A | 6/1999 | Hahn-Carlson | |
| 6,571,213 | B1 * | 5/2003 | Altendahl et al. | 705/1 |
| 6,973,385 | B2 * | 12/2005 | Ulrich | 701/207 |
| 7,039,606 | B2 * | 5/2006 | Hoffman et al. | 705/26 |
| 2001/0011250 | A1 * | 8/2001 | Paltenghe et al. | 705/41 |
| 2002/0032632 | A1 * | 3/2002 | Sernet | 705/37 |
| 2002/0035604 | A1 * | 3/2002 | Cohen et al. | 709/205 |
| 2002/0072975 | A1 * | 6/2002 | Steele et al. | 705/14 |
| 2002/0087371 | A1 | 7/2002 | Abendroth | |
| 2002/0103743 | A1 * | 8/2002 | Najmi | 705/37 |
| 2002/0111892 | A1 | 8/2002 | Sharp | |
| 2002/0174218 | A1 * | 11/2002 | Dick et al. | 709/224 |
| 2002/0188486 | A1 * | 12/2002 | Gil et al. | 705/7 |
| 2002/0188513 | A1 * | 12/2002 | Gil et al. | 705/22 |
| 2003/0014270 | A1 * | 1/2003 | Qureshi et al. | 705/1 |
| 2003/0014318 | A1 * | 1/2003 | De La Motte et al. | 705/26 |
| 2003/0028470 | A1 * | 2/2003 | Dutta | 705/37 |
| 2003/0236693 | A1 * | 12/2003 | Chen et al. | 705/9 |
| 2004/0162871 | A1 * | 8/2004 | Pabla et al. | 709/201 |
| 2004/0193482 | A1 * | 9/2004 | Hoffman et al. | 705/14 |
| 2005/0288986 | A1 * | 12/2005 | Barts et al. | 705/9 |

FOREIGN PATENT DOCUMENTS

WO    WO 97/13210    * 10/1997

OTHER PUBLICATIONS

Voelker, Michael, "Empower transactions with XML", Bank Systems & Technology, Dated May 2001.*
Jones, Allen, "Collaborating on the Net: a pie-in-the-sky strategy or the harmonious route to new-found value in your supply chain?", Canadian Transportation Logistics Dated Apr. 2001.*
Shulman, Richard, "Plan for what's ahead in the world of e-business", Supermarket Business, Dated Aug. 1999.*
Wilson Tim, "Spec Lets Apps Span Industries—XML format to grease data-sharing, transactions", InternetWeek, Jul. 17, 2000.*

(Continued)

*Primary Examiner*—Mark Fadok
(74) *Attorney, Agent, or Firm*—Ariel S. Bentolila; Bay Area IP, LLC

(57) ABSTRACT

A collaboration method and apparatus, is provided for the management of transactions and data, in a networked computing environment, between carriers and shippers in the transport of goods. In one aspect, an improved technique is provided, which reduces, or eliminates, the data redundancy in the management of transactions and data between carriers and shippers. In some embodiments, trading is done only between selected trading partners.

39 Claims, 10 Drawing Sheets

PARTIAL ACCOUNT TABLE DATA BLOCK

| AccountID | AccountType | LinkCode | Address1... | OwnerID | LinksTo | AliasID |
|---|---|---|---|---|---|---|
| 1111 | Shipper | | 434 Briar Ln. | | | |
| 2222 | Shipper | | 434 Briar Ln. | 4444 | 1111 | XYZ |
| 3333 | Carrier | | 2432 Main | 1111 | 4444 | PDQ |
| 4444 | Carrier | JAS492 | 2432 Main | | | |

LinkCode - Carriers give this code to trading partners so that they can request a network link without knowing the carrier's AccountID. The LinkCode JAS492 points to AccountID 4444 which is used to identify this carrier in a network relationship.

OwnerID - this is the code for the root account that created the record.

LinksTo - this code points to a root account within the system. The presence of a LinksTo code signifies that a network link has been formed.

AliasID - this code is created by the carrier or shipper to identify the trading partner.

Accounts 1111, 4444 - These are root accounts; they have no OwnerID or AliasID. They describe a shipper and a carrier that have access to the system.

Accounts 2222, 3333 - These are owner accounts. Account 2222 was created by carrier 4444 to describe a shipper. Account 3333 was created by shipper 1111 to describe a carrier. The carrier refers to this shipper as XYZ. The shipper refers to this carrier as PDQ.

OTHER PUBLICATIONS

PR Newswire, "Future Three, Inc. is Driving Advanced Supply Chain Execution (SCE) In The Automotive Supply Chain with its release of the Event Management Console" Dated Feb. 15, 2002.*

Fingar, "Both sides of the coin", Internet World. Cleveland: Aug. 1, 2001.*

Putzger, Ian, "Get connected: shippers and carriers preach more open communications using technology and the Internet [Council of Logistics Management roundtable", Canadian Tranport Logistics, dated Mar. 1999.*

Hannon, David, "Logistics: What's hot", Purchasing, Nov. 7, 2002.*

Atkinson, Helen, "Carriers concerned about disclosure", Jounal of Commerce, Aug. 25, 2000.*

Lynch Kevin, "The 7immutable laws of colaboration", World Trade, Oct. 2000.*

EIU ViewsWire, "USA industry: Changes for West Coast port truckers", Feb. 20, 2003.*

\* cited by examiner

PARTIAL ACCOUNT TABLE DATA BLOCK

| AccountID | AccountType | LinkCode | Address1... | OwnerID | LinksTo | AliasID |
|---|---|---|---|---|---|---|
| 1111 | Shipper | | 434 Briar Ln. | | | |
| 2222 | Shipper | | 434 Briar Ln. | 4444 | 1111 | XYZ |
| 3333 | Carrier | | 2432 Main | 1111 | 4444 | PDQ |
| 4444 | Carrier | JAS492 | 2432 Main | | | |

LinkCode - Carriers give this code to trading partners so that they can request a network link without knowing the carrier's AccountID. The LinkCode JAS492 points to AccountID 4444 which is used to identify this carrier in a network relationship.

OwnerID - this is the code for the root account that created the record.

LinksTo - this code points to a root account within the system. The presence of a LinksTo code signifies that a network link has been formed.

AliasID - this code is created by the carrier or shipper to identify the trading partner.

Accounts 1111, 4444 - These are root accounts; they have no OwnerID or AliasID. They describe a shipper and a carrier that have access to the system.

Accounts 2222, 3333 - These are owner accounts. Account 2222 was created by carrier 4444 to describe a shipper. Account 3333 was created by shipper 1111 to decribe a carrier. The carrier refers to this shipper as XYZ. The shipper refers to this carrier as PDQ.

[Browser window screenshot: carrierlink - Microsoft Internet Explorer, showing navigation menu with "ad Data", "RFQs", "Invoices", "Help" tabs, and a form with fields:]

620 → Select Carrier: PDQ - PDQ CARRIERS

630 → Link Code: JAS492

Account Code: XYZ

640

[Button]

| AccountID | AccountType | LinkCode | Addesss1... | OwnerID | LinksTo | AliasID |
|---|---|---|---|---|---|---|
| 1111 | Shipper | | 434 Briar Ln. | | | |
| 2222 | Shipper | | 434 Briar Ln. | 4444 | 1111 | XYZ |
| 3333 | Carrier | | 2432 Main St. | 1111 | 4444 | PDQ |
| 4444 | Carrier | JAS492 | 2432 Main St. | | | |

Logged on Shipper 1111 creates load number 1234:

TLOAD TABLE

| Load# | OriginName | OriginAddress..... | ShipperID | CarrierID |
|---|---|---|---|---|
| 1234 | XXXX | XXXX | 1111 | |

720

Shipper selects carrier PDQ from owner records as carrier for load:

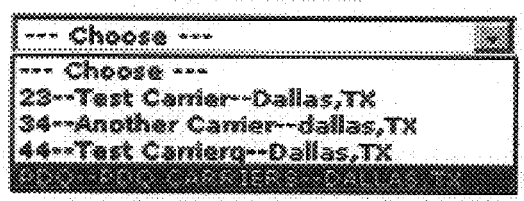

725

730

System copies LinksTo code from PDQ file to CarrierID fieild of load:

ACCOUNT TABLE

| AccountID | AccountType | Name | Address1... | OwnerID | LinksTo | AliasID |
|---|---|---|---|---|---|---|
| 3333 | Carrier | XXXX | 2432 Main | 1111 | 4444 | PDQ |

LOAD TABLE

| Load# | OriginName | OriginAddress..... | ShipperID | CarrierID |
|---|---|---|---|---|
| 1234 | XXXX | XXXX | 1111 | 4444 |

Logged on Carrier 4444 creates load number 1235:

LOAD TABLE

| Load# | OriginName | OriginAddress..... | ShipperID | CarrierID |
|---|---|---|---|---|
| 1235 | XXXX | XXXX | | 4444 |

820

Carrier selects shipper XYZ from owner records as shipper for load:

825

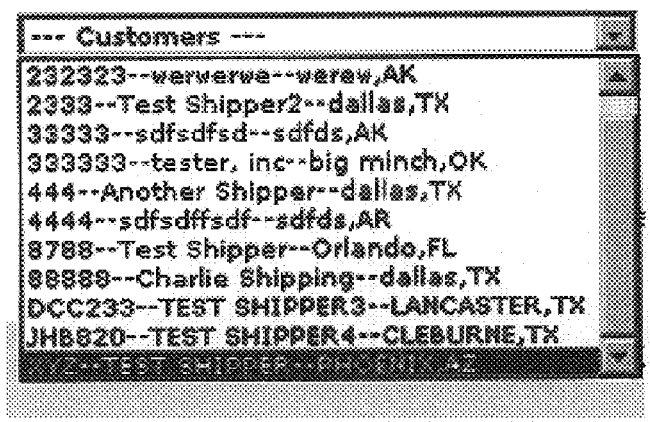

* Select Customer:

830

System copies LinksTo code from XYZ record to ShipperID field of load record:

ACCOUNT TABLE

| AccountID | AccountType | Name | Address1... | OwnerID | LinksTo | AliasID |
|---|---|---|---|---|---|---|
| 2222 | Shipper | XXXX | 434 Briar Ln. | 4444 | 1111 | XYZ |

LOAD TABLE

| Load# | OriginName | OriginAddress..... | ShipperID | CarrierID |
|---|---|---|---|---|
| 1235 | XXXX | XXXX | 1111 | 4444 |

This load record is now accessible by both shipper 1111 and carrier 4444.

LOAD TABLE

| Load# | OriginName | OriginAddress...... | ShipperID | CarrierID |
|-------|------------|---------------------|-----------|-----------|
| 1234  | XXXX       | XXXX                | 1111      |           |

920

ACCOUNT RELATIONS TABLE     930

| ShipperID | CarrierAliasID | CarrierID | ShipperAliasID |
|-----------|----------------|-----------|----------------|
| 1111      | PDQ            | 4444      |                |
| 1111      |                | 4444      | XYZ            |

940

LOAD TABLE

| Load# | OriginName | OriginAddress...... | ShipperID | CarrierID |
|-------|------------|---------------------|-----------|-----------|
| 1234  | XXXX       | XXXX                | 1111      | 4444      |

METHOD, APPARATUS AND MEDIUM FOR DATA MANAGEMENT COLLABORATION IN THE TRANSPORT OF GOODS

FIELD OF THE INVENTION

The present invention relates generally to collaboration in the management of data related to the transport of goods. More particularly, the invention relates to a network application that allows shippers and service providers in the transport of goods to collaborate in the management of shared transaction data.

BACKGROUND OF THE INVENTION

Consumers (i.e., shippers and receivers of freight, "shippers") and Providers (i.e., carriers of freight and third party logistics providers, referred to as "carriers") of transportation services have a need to communicate and manage data, which is created in the course of transacting with one another. The data sets managed by shippers and carriers are distinct but do have a significant amount of overlap, particularly in the data describing loads to be transported. A "shipment" is commonly understood to be a collection of goods to be transported which share a common point of origin, a common destination, and a common ship date, whereas a "load" is understood to be a collection of one or more shipments.

Conventional applications addressing the needs of both the consumer and provider have typically fit into one of the following two general categories; that is, either internet marketplaces or role-biased applications, which are commonly operated by shippers and/or carriers who may or may not allow limited network access for trading partners.

There are many vendors of role-biased applications designed for either shippers (e.g., supply chain management and execution) or carriers (e.g., dispatch and operations). The marketplace approach is focused on making a market and predicated on the concept of buyers and sellers. A buyer (e.g., shipper) is responsible for creating load records that describe the service they are seeking to purchase. A plurality of sellers (e.g., carriers) responds to the requests for service with a price-bid and/or, in the case where the price is agreed upon, a willingness to perform the service. Sellers may also post their capability to provide certain services. The main objective of the marketplace approach is the discovery of an opportunity to do business and an agreement to buy and sell a service.

The marketplace approach focuses on a process where shippers enter load-data for goods which they need transported while carriers browse the loads and inquire about and/or bid on the loads. The marketplace requires a critical mass of shippers and carriers to be effective. The management of data is secondary to the function of making a market. This treatment tends to reduce the effectiveness of the data for transportation management and communication functions.

The role-biased application approach is software designed to accomplish transportation management functions and focused on the tools needed for a particular role in the transaction. In common practice, shippers buy or subscribe to supply chain execution and logistics solutions that are suited to the creation of data from the shipper's standpoint and most often include inventory, vendor, warehouse, and shipment management modules. The role-biased approach is inherently designed to increase utility for the user on one side of the shipper/carrier transaction, but not both. Typically, load records are initiated by whichever party acts in the role the system is biased towards.

These systems may allow carriers to contribute status data on the loads they are handling through web browsers, web services, or messaging systems such as one known as EDI. Carriers buy or subscribe to software solutions that are designed to manage transport operations and usually include modules focused on load data, customer data and the management of resources such as carriage equipment (e.g., vehicles, trailers, containers) and other carriers that they may sub-contract with. Systems such a these may allow shippers to make service requests and/or inquire about load status.

Some disadvantages of the role-biased approach include availability of interactivity, redundancy of work, integration, and training issues. For example, even if one assumes that some degree of interactivity is provided, each participant must still maintain redundant data on each of their respective systems. Somehow integrating and eliminating the redundant data is problematic for all of the commonly known reasons such as interoperability, data structures, data types, and network infrastructure. Moreover, training becomes an issue when participants are forced to learn how to operate a different system for each trading partner.

The principal means of overcoming the foregoing disadvantages of conventional applications has been the reliance on adhoc communication means such as telephone, facsimile, and email communications between trading partners. Moreover, when a shipper and a carrier have agreed to form a relationship, the actions of either party in the maintenance of their load records does not contribute to the data available to their counterpart.

In view of the foregoing, there is a need for improved techniques for transportation services applications addressing the needs of both the consumer and provider. It would be desirable for such an improved application to substantially reduce or eliminate the data redundancy inherent in the role-biased approach, similarly, lessen or the need of a critical mass of providers to be effective, as is inherent in the marketplace approach. It would be further desirable if the management of data plays an important role in making the market, thereby improving the effectiveness of the data for transportation management and communication functions. Another desirable capability would be to contribute to the transactional data available to their counterpart when a shipper and a carrier have agreed to form a relationship.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates an exemplary account record fields and account types, according to an embodiment of the present invention.

FIG. 6 illustrates an exemplary GUI form for requesting a communications link with a carrier and the method used to create a link.

FIG. 7 illustrates the method for a shipper to create a shared load record in accordance with an embodiment of the present invention.

FIG. 8 illustrates the process of a carrier creating a shared load record, according to an embodiment of the present invention.

Figure 1:
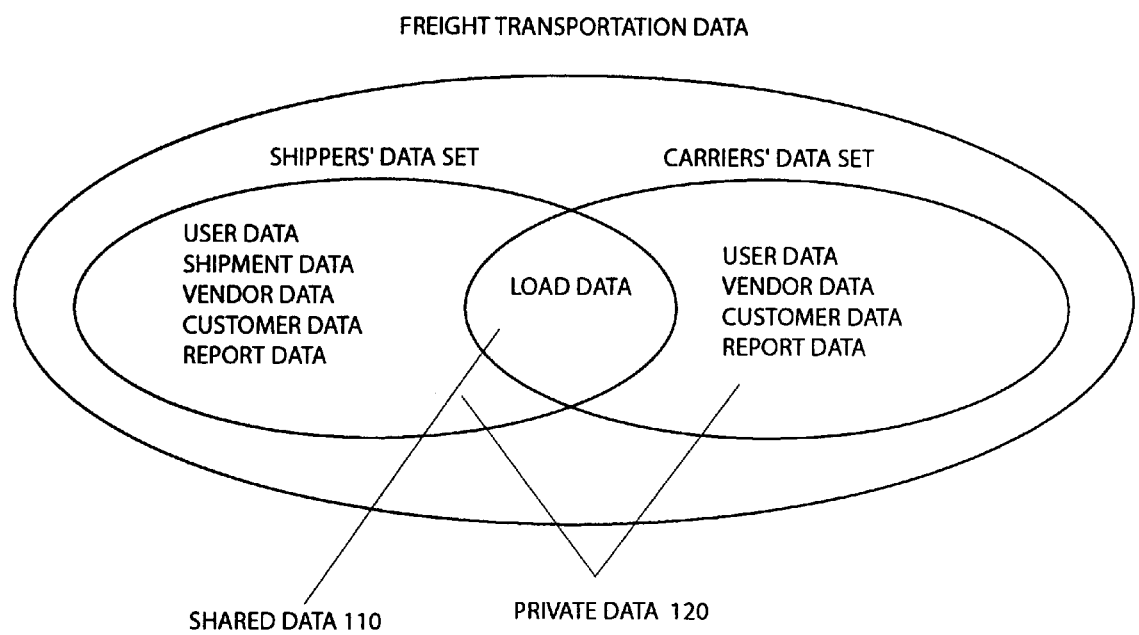
FIG. 1 is a diagrammatic illustration of the relationship of shared and private data between shippers and carriers relative to their respective freight transportation data sets.

Unless otherwise indicated illustrations in the figures are not necessarily drawn to scale.

SUMMARY OF THE INVENTION

To achieve the forgoing and other objects and in accordance with the purpose of the invention, a variety of a collaboration means, method, apparatus, and software is provided for the management of transactions and data, in a networked computing environment, between carriers and shippers in the transport of goods, which includes means, steps, elements, and software code that substantially achieve the following.

One aspect of the present invention is that an improved technique is provided, which reduces, or eliminates, the data redundancy (e.g., non-private data) inherent in conventional techniques that manage transactions between carriers and shippers. In one embodiment, at least one carrier and shipper account is created that each have associated private data and non-private data, wherein the private data set is not communicated to the other party and the non-private data may be communicated to the other party. In this embodiment, if the shipper and the carrier have agreed to form a relationship or have completed a transaction, establishing over the network a communications link between the shipper and carrier for the purpose of sharing non-private data, and then communicating at least a portion of the shipper's or carrier's non-private data sets through the communications link.

Some alternative embodiments, further enable the establishment of at least one preferred trading partner in at least one carrier account, where the preferred trading partner is a desirable entity for the carrier to conduct business with. In certain applications of this embodiment, carriers only accept requests for cost quotes from their established preferred trading partners. Similarly, carriers would only provide their cost quote to their established preferred trading partner. Other similar embodiments apply the same preferred trading partner as appropriate for shippers as well.

Alternative embodiments of the present invention may further provide for the maintaining records for the loads in the process of being transported. For example, a load record may be created manually, or semi-automatically.

Many embodiments of the present invention may provide for the assigning of at least one of the carriers to transport the load, or for the designation of at least one of the shippers as the shipper of the load, where after delivery of the load, some embodiments communicate that the load was delivered, for example, by communicating a bill of lading, which is considered to be part of the non-private data set of the shippers or carriers.

Certain embodiments of the present invention may preserve the anonymity of a shipper and/or a carrier. In some instances of the present invention, typical private data of the carriers includes carrier user data, carrier shipment data, carrier vendor data, carrier customer data, or carrier report data, and that for shippers may include shipper user data, shipper shipment data, shipper vendor data, shipper customer data, or shipper report data. Moreover, non-private data of the shippers or carriers may also include at least part of the data in a load record in many embodiments of the present invention, and non-private data sets of the shippers or carriers may include load information, quote information, invoice information, or bill of lading information.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

Freight transportation data sets managed by shippers and carriers have distinct differences, e.g., a private data 120, but also significantly overlap, e.g., a shared data 110. FIG. 1 is a diagrammatic illustration of the relationship of shared and private data 120 between shippers and carriers relative to their respective freight transportation data sets. An aspect of the present invention is to provide shippers and carriers the network interfaces needed to create, maintain, and integrate shared data into their respective data sets and client applications, thereby minimizing, or eliminating, redundancy of data.

As shown in the Figure, an example of a central type of shared data 110 between shippers and carriers is the data that describes loads. The supply chain execution applications operated by shippers allow the shippers to create and maintain at least one record for each load. The dispatch and operations applications operated by carriers allow the carriers to create and maintain at least one record for each load. By way of example, and not limitation, these records typically comprise information such as addresses, phone numbers, dates, carriage equipment requirements, and descriptions of the shipments and freight comprising the load.

The following additional aspects of the present invention precede an enabling detailed description of embodiments. For instance, another aspect of the present invention relates to its prescribed approach to the concepts of network relationships and the rights within the present system to create, view, and modify load records. Yet another aspect of the present invention is to provide an opportunity to parties in the transaction to agreement upon sharing data. For example, in one embodiment, when a shipper and a carrier have agreed to form a network relationship, the actions of either party in the maintenance of their load records which reference their relationship contributes to the data set of their counterpart. By enabling either party to initiate load records, the shipper can use the present system in a passive fashion and gain the ability to manage load data with a level of effort of their choosing, if the shipper requires its carriers to operate the present system to document the shipper's loads. In this way, the present aspect provides carriers an opportunity to increase customer service and communications efficiency. Moreover, the present aspect avails its carriers by way of reduced data entry burdens, increased data accuracy, and timeliness of data availability; especially, when the shipper actively operates the present system (e.g., initiates loads).

Figure 2:
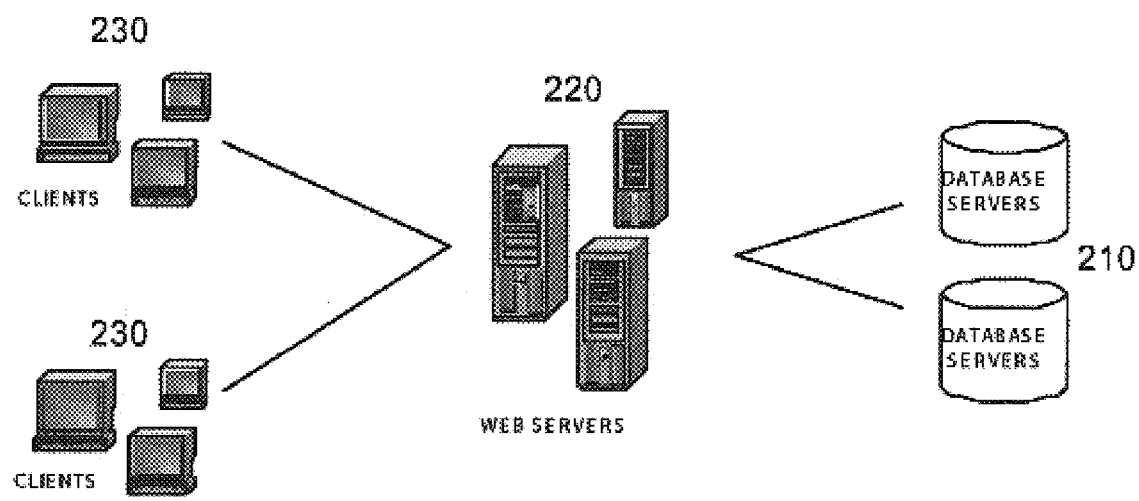
FIG. 2 illustrates an exemplary physical architecture for carrying out an embodiment of the present invention.

FIG. 2 illustrates an exemplary physical architecture for carrying out an embodiment of the present invention. If the Figure, a networked, multi-tiered architecture for implementing the present software application is shown, which includes a database server(s) 210, a Internet server(s) 220, and a networked client(s) 230. Each element of the present architecture is well known to those skilled in the art who, correspondingly, will readily recognized optimal implementations and variations of the teaching presented herein depending on the particular application. For example, the network shown in the Figure is implemented by way of the Internet, however, any suitable network may be implemented, including, but not limited to, intranets, LANs, WANs, wireless, telephone, satellite, etc. Similarly, one embodiment of a database suitable for the present invention is Standard Query Language (SQL) in accordance with known techniques and resides on database server(s) 210. However, alternative embodiments will implement the database and corresponding database server(s) in a multiplicity of known ways to best suit the particular application. Suitable database server(s) may be commonly available general computing systems comprising computer storage memory, and computer hardware/software that supports conventional database utility as required, for example, by database interface languages such as SQL. Similarly, Internet servers may be computing platforms that are similar to database servers, except that they are configured to support Internet applications and communications. Networked clients may, likewise, be commonly available general-purpose computers that are configured to properly communicate and interact with the Internet servers.

An aspect of the present database is designed to manage data sets for three types of entities: shippers, carriers, and administrators. Some example data structures for each entity type shall be set forth in the following paragraphs.

Shipper's data subsets include, but are not limited to, shipment data, load data, carrier data, vendor and customer data, user data, request for quotes (RFQ) data, and image data, wherein all data except load, quote, and image data is preferably private to the shipper and, thereby, cannot be accessed or manipulated by any party other than the shipper's registered users. Shipment data comprises information about a collection of goods to be transported that share a common origin, destination, and ship data. Load data describes a collection of one or more shipments to be assigned to a carrier as a transaction. Carrier data comprises information about companies the shipper contracts with who haul loads or arrange for loads to be hauled; including, but not limited to, third party logistics providers such as brokers, freight forwarders, etc. Vendor and customer data comprises information about parties that the shipper either sends freight to or receives freight from. User data comprises information about persons who have access to the shipper's data. Quote data comprises information about rates that carriers have submitted for services. Image data comprises records in an image format (e.g., tiff, jpeg, pdf, etc.).

Carrier's data subsets include, but are not limited to, load data, customer data, carrier data, user data, quote data, and image data. Customer, carrier and user data are preferably private and accessible only to the carrier's registered users. Load data describes loads hauled or brokered for shippers. Customer data comprises information about shippers. Carrier data comprises information about other carriers that the carrier sub-contracts with (brokers) to haul loads. User data comprises information about persons who have access to the carrier's data. Quote data comprises information about price quotes the carrier has submitted to shippers. Image data comprises records in an image format (e.g., tiff, jpeg, pdf, etc.).

Administrator's data subsets comprise information about user data, and account data. All Administrator data is preferably private to the present system administrator's registered users. User data comprises information about persons that have access to administrative data. Account data comprises information about shippers and carriers that can add users with access to the present system.

In the present embodiment, the data type relevant to data sharing is the load data. A partial listing of typical load data fields that would be shared between shippers and carriers in contract motor-freight applications includes, but is not limited to, the following:

Shipper Name
Origin Address
Origin Address2
Origin City
Origin State
Origin Zip
Origin Phone
Origin Contact
Origin Email
Pickup Date
Pickup Time
Pieces
Weight
Description
Consignee Name
Destination Address
Destination Address2
Destination City
Destination State
Destination Zip
Destination Phone
Destination Contact
Destination Email
Delivery Date
Delivery Time
Trailer Type
Mileage
Rate per Mile
Base Rate
Accessorials
Accessorial Charges
Fuel Surcharge
Total Charges
Shipper Number It should be understood that although the foregoing list of fields is well suited to contract motor-freight application, it is not in any manner complete, especially, given that there are many other modes of transport.

Those skilled in the art will readily recognize a multiplicity of suitable proprietary and/or public network or protocol that may be used to carry the teachings of the present invention, whereby all necessary databases, networks, and user interfaces may be properly configured by those skilled in the art in accordance with the present invention. An example of a suitable platform to carry out the present invention is an Internet based, Web browser graphical user interface (GUI) system; i.e., a Web server residing on Internet servers(s) 220 and web browsers remotely running on client(s) 230 the execute web browser or proprietary software executable code accomplishing the GUI as exemplified in the following embodiments, a Web application in corporation with the web server servers web pages to the web browsers. In some alternative embodiments, the web application, instead, may be configured to execute, at least partly, on Internet servers(s) 220 and/or on client(s) 230.

In the present embodiment, the web application is served interactive GUI information via database server(s) 210 via a common point-to-point internet data path (e.g., from a LAN (local area network)/dial-up/broadband connection to an internet service provider(s), and over the Internet back to a reversed, but similar receiving path). The present web application controls access to database server(s) 210 and allows for data manipulation preferably through two means; web pages (HTML) and Web Services (SOAP, extensible mark up language, or XML). The present web application provides substantial functionality for both shippers and carriers to manage both private and shared data. The application also allows system administrators to administer the present system. Alternative embodiments that implement a proprietary version of the present web application, likewise, may have proprietary protocols and data manipulation means.

The web application generates web pages for data manipulation. The home page includes fields to enter a username and a password. The web application validates the username/password combination and returns a web page appropriate to the user. Users are served pages with GUI elements to data manipulation for their account and account type. An initial page for all user types may be an administrative console. However, some alternative embodiments may not implement the administrative console as the initial page, whereby it would be reached by some other suitable entry point.

Figure 3:
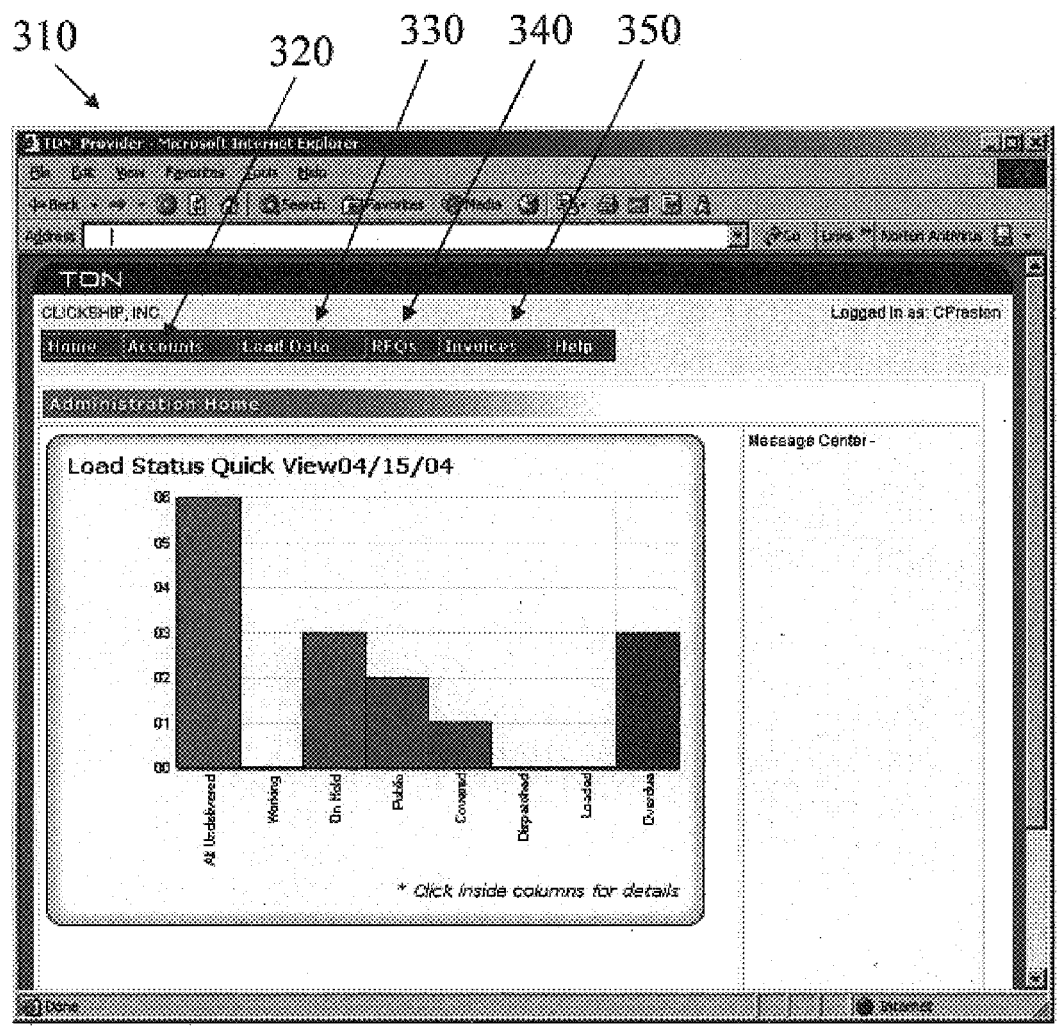
FIG. 3 illustrates an administrative console for carriers 310 according to an embodiment of the present invention.
Figure 4:
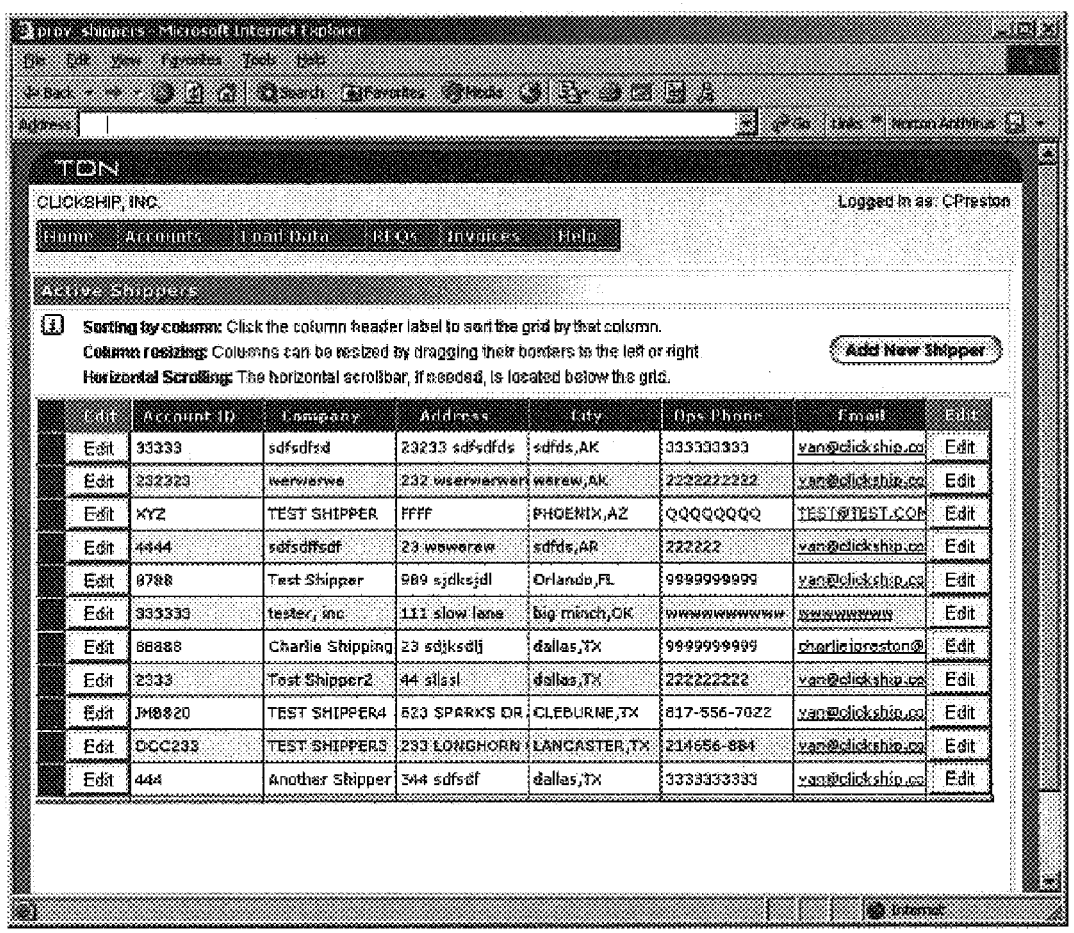
FIG. 4 illustrates an exemplary embodiment of the grid presentation format according to an embodiment of the present invention displayed in a web browser.

FIG. 3 illustrates an administrative console for carriers 310 according to an embodiment of the present invention. In the present embodiment, selecting menu items or clicking a mouse pointer on graphic elements returns a page with the appropriate data. In the case where multiple records meet the request criteria, the data is presented in a grid format. FIG. 4 illustrates an exemplary embodiment of the grid presentation format according to an embodiment of the present invention displayed in a web browser. The grid format enables the user to refine his or her search and select the specific record of interest. Selecting a record from a grid returns a web form that enables the user to manipulate the data. Those skilled in the art will readily recognize a multiplicity of alternative embodiments of the administrative console, which may provide more or less functionality as required by the particular application. Similarly, alternative embodiments may implement any combination the administrative console's elements separately over a multiplicity of separate web pages, or GUI windows, instead of all consolidated into a single web page.

In the present embodiment, shippers are served web pages for managing data related to users, carriers, customer/vendors, shipments, loads, and requests for quotes. An exemplary scenario for a shipper operating the present system in a private manner may include the following steps, referring to FIG. 3:

1. The system administrator creates an account for the shipper and an administrative user for the shipper, providing the user with a username and password. via an account manager link 320, for example.
2. The shipper's administrative user creates individual user accounts for other personnel; the user accounts being created with individual username, password, and rights.
3. The shipper's individual user(s) creates records for carriers and vendor/customers, which are typically businesses that either send the shipper loads or receive loads from the shipper, accessed via a load manager link 330, for example.
4. The shipper's individual user(s) creates and maintains records for shipments in process.
5. The shipper uses the present system to request and receive quotes from carriers for hypothetical loads via a RFQ link 340, for example.
6. The shipper's individual user(s) selects the desired shipments to create a load or manually enters load data. To reduce the amount of data entry typing required, some embodiments may be provided with the ability to build loads from existing shipments and/or selecting customer/vendor data from drop down lists.
7. The shipper's individual user(s) assigns a carrier for the load.
8. After delivery of the load, the shipper's individual user(s) indicates load has been delivered.
9. The shipper's individual user(s) uploads an image of the signed bill of lading so that all users can view or print it as a proof of delivery—via invoice link 350, for example.
10. The shipper's individual user(s) views reports on shipment, load, and carrier activity.

Similarly, carriers are served pages for managing data related to users, shippers, other carriers to be used as subcontractors, loads, and requests for quotes. An exemplary embodiment for a carrier operating the present system in a private manner may include the following steps:

1. The system administrator creates an account for the carrier and an administrative user for the carrier, providing the user with a username and password.
2. The carrier administrative user creates user accounts for other personnel, creating the user account with an individual username, password, and rights.
3. The carrier individual user(s) creates records for shippers and carriers.
4. The carrier individual user(s) creates load records.
5. The carrier individual user(s) assigns a shipper for the load.
6. The carrier individual user(s) modifies load records through their life cycles to delivery.
7. The carrier individual user(s) uploads image of signed bill of lading so that all users can view or print it as a proof of delivery.
8. The carrier individual user(s) views reports on load, shipper, and carrier activity.

The steps of creating user accounts, records, invoices, making assignments in a database, and otherwise manipulating data as described above are routine and well known to those skilled in the art. It should also be noted that the foregoing exemplary scenarios do not necessarily include provisions for shared data.

In the present embodiment, there are two principal types of account records that are maintained in the database; they are, root records and owner records. Root records are created, typically, by the system administrator and comprise information related to access rights and billing matters, e.g., information about the shippers and carriers that have will have access rights to the present system and that will be billed for using the present system. By way of example, and not limitation, whenever a user logs onto the present system, the user's root account code is identified and stored in memory, whereby the user requests various types of information, the root account code is used as query criteria to select data from the database. Owner account records are created by shippers and carriers to describe the carriers and shippers that they do business with. Owner records include a field, herein referred to as AliasID, which is created by the owner that is unique to the owner's record set. For instance, a carrier could not use the same (AliasID) code to identify more than one shipper.

FIG. 5 illustrates an exemplary account record fields and account types, according to an embodiment of the present invention. Owner records are, generally, entirely private to their creator, with the exception of certain information that should be shared with parties to the transaction. Hence, the present system is further provided with a method to recognize when data is to be shared; for instance, and without limitation, when a shipper assigns a carrier to a load, that load becomes part of the carrier's root account data set. Similarly, when a carrier creates a load referencing the shipper account, the load becomes part of the shipper's root account data set. In the present embodiment, a communications link is employed to carry out this sharing of data.

A suitable communications mode to enable the sharing of data is by way of Internet web pages; particularly a Request Carrier Link GUI form 610. FIG. 6 illustrates an exemplary GUI form for a shipper requesting a communications link with a carrier and the method used to create a link. Under GUI form 610 is shown the account record table from FIG. 5. Lines are drawn between entries in GUI form 610 and the account record table to illustrate how the information submitted from GUI form 610 may be properly entered into the corresponding field of the account record table. The first field shown is a Select Carrier field 620, which lists the owner records that the shipper has created to describe carriers. The second field is a Link Code 630, which is a unique code that the carrier must give to the shipper. The link code is given to the carrier's administrative user when a carrier joins the present system and points to the carrier's root account code within the present system. In the present embodiment, the link code enables the carrier to keep its root account code private. The final field is an Account Code 640, which also comes from the carrier and is the code that identifies the owner record that is maintained by the carrier to describe the shipper. In the instant embodiment of the present invention, the valid information provided in fields 620, 630, and 640, combined with the stored root account code of the shipper is sufficient to create a communications, or network, link.

Each owner record in the present embodiment has a field 650, herein referred to as LinksTo. Network links are created by populating LinksTo field 650 of the owner record with the corresponding root account code 660 of the trading partner. Submission of Request Carrier Link GUI form 610 provides the present system the shipper root-account code (stored in memory, for example, upon user login) and the account code (via Select Carrier field 620) of the owner account that properly identifies the carrier for the shipper.

The root account code of the carrier (derived from Link Code 630) is inserted into the LinksTo field 650 of the owner record. The Request Carrier Link GUI form 610 also gives the present system the account code (derived from Account Code 640) for the owner record maintained by the carrier to describe the shipper. Similarly, the root account code of the shipper is inserted into LinksTo field 650 of the owner account. Thereafter whenever shipper 1111 selects the carrier that they refer to as PDQ, for example, as the carrier for a load, PDQ users will have access to the load record. Also whenever carrier 4444 selects the shipper they refer to as XYZ, for example, as the shipper of a load, XYZ users will have access to the load record. Hence, in this way, the shipper and carrier may share access to the load files that they create which reference one another.

Load records in the present embodiment are configured to each comprise data for system administrators, shippers and/or carriers. In a preferred embodiment, shipper and carrier users have access to only those fields that are appropriate to their respective roles. By way of example, and not limitation, a load record may contain references to individual shipment records that make up the load. These references are used by the shipper only and are not made available to the carrier. Similarly, carriers will maintain information related to subcontractors they use on the load. These fields of the load record are made available only to the carrier's users. In an alternative embodiment, load records may be split into tables that contain relevant information organized by role or some other suitable category.

FIG. 7 illustrates the method for a shipper to create a shared load record in accordance with an embodiment of the present invention. Load records of the present embodiment include fields for root account codes for both a shipper (ShipperID) and a carrier (CarrierID). For example, Step 710 illustrates how a shipper creates a load in the present embodiment; that is, the ShipperID field in the load record is populated with the shipper's root account code. The load record at this point is accessible only by shipper 1111. This record can thereafter be returned in the shipper's queries for load data. The shipper may at some point assign a carrier to the load in Step 720. By way of example, and not limitation, the shipper may assign a carrier to a load by selecting from a list of owner records that the shipper maintains to describe its carriers. The web application in cooperation with the database server (i.e., the present system) copies LinksTo from the Shipper's Owner file to the CarrierID field of the load record. This load record is now suitable to be returned in the carrier's queries for load data. Both the shipper 1111 and the carrier 4444 can now manipulate the load record fields, many of which are shared, that they have access to. Those skilled in the art will recognize a multiplicity of alternative embodiments that may vary, replace, add, swap, or eliminate steps depending on the requirements of the particular application.

In a similar manner, the present invention further enables carriers to create load files that are shared. FIG. 8 illustrates the process of a carrier creating a shared load record, according to an embodiment of the present invention. The Steps are substantially the same as that shown in FIG. 7, except that "CarrierID" is replaced with "ShipperID." For example, the load record at Step 810 is accessible only by carrier 4444, etc.

Figure 9:
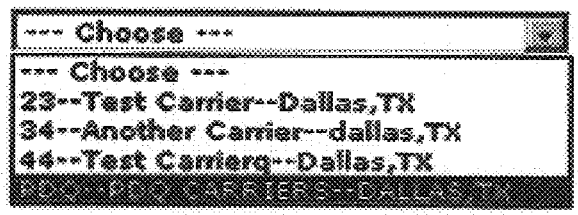
FIG. 9 illustrates an exemplary Account Relations Table approach to a shipper creating a shared load file, in accordance with an embodiment of the present invention.

FIG. 9 illustrates an exemplary Account Relations Table approach to a shipper creating a shared load file, in accordance with an embodiment of the present invention. At Step 910, logged on Shipper 1111 creates load number 1234. The load at this point is accessible only by shipper 1111. At Step 920, the shipper selects carrier, PDQ for example, from the owner records as the carrier for the load. At Step 930, the present system uses the selected carrier code and the user's account code to identify account relationship. At Step 940, the present system copies CarrierID from the relationship record to CarrierID field of the load record. This load record is now accessible by both shipper 1111 and carrier 4444.

The foregoing embodiment implementing the linked account/owner account approach has several useful aspects. One aspect is that shippers and carriers may regard their trading partner relationships as private. Another aspect is that linked owner files give them the ability to secure and manage their account information while also leveraging a networked architecture. In an alternative embodiment, users may be, instead, forced to share account files that describe accounts. In such embodiments, a search would be conducted to determine whether a trading partner has already been described within the present system, whereby if so, the user would then indicate that his or her account has a preexisting relationship with that trading partner, or be allowed add a new account record to the present system. Moreover, such users would also have the ability maintain private data on the account in a separate table(s) or data structures.

Those skilled in the art will readily recognize that the foregoing database fields and database architecture and data structures might be implemented in a multiplicity of alternative and known ways depending on the requirements of the particular application. For example, regarding the "LinksTo" field, the same record coding effects could be achieved by recording trading partner account relationships in a separate database table in addition to the Accounts table that records network links, which could also be used to retrieve the account codes needed to enable data sharing.

It should be appreciated that in many applications the minimum data required to carry out the present invention is the load data and other data needed to direct record access and sharing. It should be further appreciated that web services describe what data is needed in order to access the present system and manipulate data therein. Alternative embodiments of the present invention may configure the client application to handle this data internally in any way its system/applications designers choose; such client-side embodiments may be configured with web services that send updates to and receive updates from the present system (e.g., internet and/or database servers), whereby the web services may be distributed in part or in whole on the client and/or server sides. The concept of data sharing in the foregoing alternative embodiments is no different than that described for the web pages approach except for the aspect that any software application with ability to communicate via web services could potentially be made a client of the present system.

Figure 10:
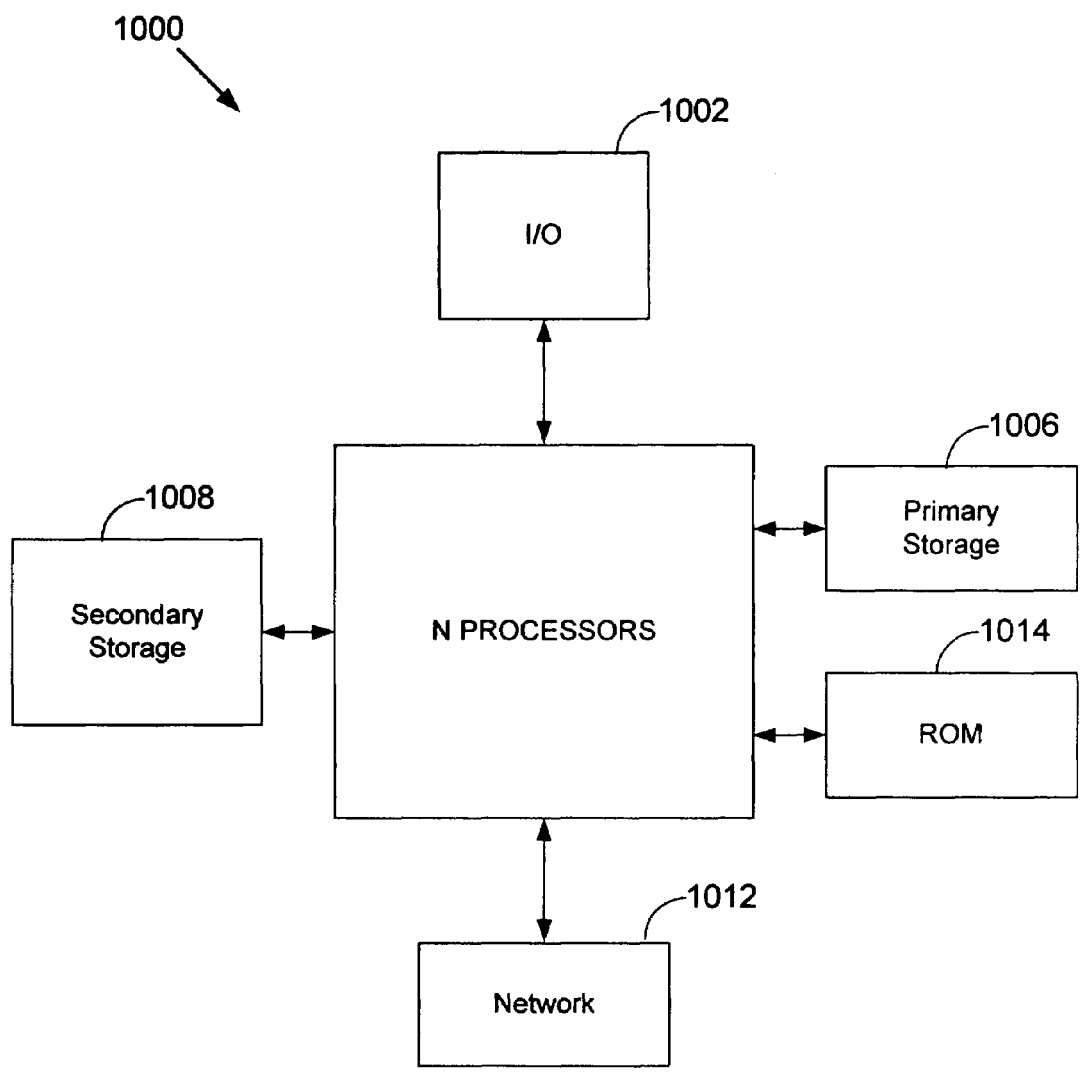
FIG. 10 illustrates a typical computer system that, when appropriately configured or designed, can serve as a computer system in which the invention may be embodied.

FIG. 10 illustrates a typical computer system that, when appropriately configured or designed, can serve as a computer system in which the invention may be embodied. The computer system 1000 includes any number of processors 1002 (also referred to as central processing units, or CPUs) that are coupled to storage devices including primary storage 1006 (typically a random access memory, or RAM), primary storage 1004 (typically a read only memory, or ROM). CPU 1002 may be of various types including microcontrollers and microprocessors such as programmable devices (e.g., CPLDs and FPGAs) and unprogrammable devices such as gate array ASICs or general purpose microprocessors. As is well known in the art, primary storage 1004 acts to transfer data and instructions uni-directionally to the CPU and primary storage 1006 is used typically to transfer data and instructions in a bi-directional manner. Both of these primary storage devices may include any suitable computer-readable media such as those described above. A mass storage device 1008 may also be coupled bi-directionally to CPU 1002 and provides additional data storage capacity and may include any of the computer-readable media described above. Mass storage device 1008 may be used to store programs, data and the like and is typically a secondary storage medium such as a hard disk. It will be appreciated that the information retained within the mass storage device 1008, may, in appropriate cases, be incorporated in standard fashion as part of primary storage 1006 as virtual memory. A specific mass storage device such as a CD-ROM 1014 may also pass data uni-directionally to the CPU.

CPU 1002 may also be coupled to an interface 1010 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to an external device such as a database or a computer or telecommunications network using an external connection as shown generally at 1012. With such a connection, it is contemplated that the CPU might receive information from the network, or might output information to the network in the course of performing the method steps described herein.

Having fully described at least one embodiment of the present invention, other equivalent or alternative methods of providing a network application that allows shippers and service providers in the transport of goods to collaborate in the creation of shared transaction data according to the present invention will be apparent to those skilled in the art. The invention has been described above by way of illustration, and the specific embodiments disclosed are not intended to limit the invention to the particular forms disclosed. For example, alternative embodiments of the web application exist that include web services that are designed to provide implementations not using web-browsers the same data manipulation functionality as described for web pages to client applications, whereby non-web-browser and/or non-internet implementations of the present invention are contemplated as within the scope of the present invention. Moreover, although the foregoing described embodiments were directed to collaboration in the transportation of goods, those skilled in the art will readily identify and adapt teachings of the present invention to other suitable applications. The invention is thus to cover all modifications, equivalents, and alternatives falling within the spirit and scope of the following claims.

What is claimed is:

1. In a networked computing environment, a collaboration method for the management of data between a carrier and a shipper in the transport of goods, the collaboration method comprising the steps of:

creating at least one carrier account in a database on a central data server, the created carrier account having an associated private carrier data set and a non-private carrier data set, where the non-private carrier data set contains records for data that the carrier agrees to share, the created carrier account having at least one record in the non-private carrier data set containing a shipper ID code for uniquely identifying the shipper to the carrier;

creating at least one shipper account in the database on the central data server, the created shipper account having an associated private shipper data set and a non-private shipper data set, where the non-private shipper data set contains records for data that the shipper agrees to share, the created shipper account having at least one record in the non-private shipper data set containing a carrier ID code for uniquely identifying the carrier to the shipper;

creating a link code in a record of the created carrier account or the created shipper account;

requesting a network link between the shipper or carrier to the central data server by submitting the link code along with the carrier ID or shipper ID, the requesting enabling records in the created carrier account containing the shipper ID to be linked to the created shipper account and records in the created shipper account containing the carrier ID to be linked to the created carrier account;

establishing over the network an interactive communications link between the shipper or carrier to the central data server for sharing and updating linked records in the non-private carrier data set and the non-private shipper data set-substantially eliminating duplicate records; and communicating at least a portion of the linked records through the communications link where updates made to the linked records by the shipper or carrier are stored in the database.

2. The collaboration method of claim 1, further comprising the step of establishing at least one data sharing partner in the at least one carrier account, wherein the data sharing partner is the shipper for which the carrier has agreed to share data with.

3. The collaboration method of claim 1, further comprising the step of establishing at least one data sharing partner in the at least one shipper account, wherein the data sharing partner is the carrier for which the shipper has agreed to share data with.

4. The collaboration method of claim 1, further comprising the step of maintaining records in linked records for loads that have been transported and in the process of being transported.

5. The collaboration method of claim 1, further comprising the step of creating a load record in linked records.

6. The collaboration method of claim 5, wherein creating the load record is at least in part automatically done based on a preexisting account data, wherein the load record corresponds to a load to be transported.

7. The collaboration method of claim 5, wherein creating the load record is at least in part automatically done by selecting a customer or a vendor data from a drop down list.

8. The collaboration method of claim 5, further comprising the step of the shipper assigning the carrier to transport the load.

9. The collaboration method of claim 5, further comprising the step of the carrier assigning the shipper as the shipper of the load to facilitate linking of the records.

10. The collaboration method of claim 5, further comprising the step of, after delivery of the load, communicating that the load was delivered by updating linked records.

11. The collaboration method of claim 10, wherein communicating delivery of the load is done by communicating a bill of lading, the bill of lading being comprised in linked records.

12. The collaboration method of claim 8, further comprising the step of communicating reports on shipment, load, or carrier activity, wherein the shipment, load, or carrier activity reports are comprised in linked records.

13. The collaboration method of claim 1, wherein the private data set of the carrier comprises carrier user data, carrier shipment data, carrier vendor data, carrier customer data, or carrier report data.

14. The collaboration method of claim 1, wherein the private data set of the shipper comprises shipper user data, shipper shipment data, shipper vendor data, shipper customer data, or shipper report data.

15. The collaboration method of claim 1, wherein the non-private data sets of the shipper or carrier comprises at least part of the data in a load record.

16. The collaboration method of claim 1, wherein the non-private data sets of the shipper or carrier comprises load information, quote information, invoice information, or bill of lading information.

17. In a networked computing environment, an apparatus for the management data between carriers and shippers in the transport of goods, the apparatus comprising:

means for creating at least one carrier account in a database on a central data server, the created carrier account having an associated private carrier data set and a non-private carrier data set, where the non-private carrier data set contains records for data that can be shared by a carrier, the created carrier account having at least one record in the non-private carrier data set containing a shipper ID code for uniquely identifying the shipper to the carrier;

means for creating at least one shipper account in the database on the central data server, the created shipper account having an associated private shipper data set and a non-private shipper data set, where the non-private shipper data set contains records for data that can be shared by a shipper, the created shipper account having at least one record in the non-private shipper data set containing a carrier ID code for uniquely identifying the carrier to the shipper;

means for creating a link code in a record of the created carrier account or the created shipper account;

means for requesting a network link between the shipper or carrier to the central data server by submitting the link code along with the carrier ID or shipper ID, the requesting enabling records in the created carrier account containing the shipper ID to be linked to the created shipper account and records in the created shipper account containing the carrier ID to be linked to the created carrier account;

means for establishing over the network an interactive communications link between the shipper or carrier to the central data server for sharing and updating linked records in the non-private carrier data set and the non-private shipper data set substantially eliminating duplicate records; and means for communicating at least a portion of the linked records through the communications link where updates made to the linked records by the shipper or carrier are stored in the database.

18. The apparatus of claim 17, further comprising means for establishing at least one data sharing partner in the at least one carrier account, wherein data sharing partner is the shipper for which the carrier has agreed to share data with.

19. The apparatus of claim 17, further comprising means for establishing at least one data sharing partner in the at least one shipper account, wherein the data sharing partner is the carrier for which the shipper has agreed to share data with.

20. The apparatus of claim 17, further comprising means for maintaining records for loads that have been transported and in the process of being transported.

21. The apparatus of claim 17, further comprising means for creating a load record, the load record being associated with a load.

22. The apparatus of claim 17, further comprising means for at least one of the shippers assigning at least one the carriers to transport a load.

23. The apparatus of claim 17, further comprising means for at least one of the carriers assigning at least one the shippers as the shipper of a load.

24. The apparatus of claim 17, further comprising means for, after delivery of a load, communicating that the load was delivered.

25. The apparatus of claim 17, further comprising means for communicating reports on shipment, load, or carrier activity, wherein the shipment, load, or carrier activity reports are comprised in the non-private data set of the shippers or carriers.

26. The apparatus of claim 17, wherein the private data sets of the carriers comprises carrier user data, carrier shipment data, carrier vendor data, carrier customer data, or carrier report data.

27. The apparatus of claim 17, wherein the private data sets of the shippers comprises shipper user data, shipper shipment data, shipper vendor data, shipper customer data, or shipper report data.

28. The apparatus of claim 17, wherein the non-private data sets of the shippers or carriers comprises at least part of the data in a load record.

29. The apparatus of claim 17, wherein the non-private data sets of the shippers or carriers comprises load information, quote information, invoice information, or bill of lading information.

30. A computer program product for the management of data between a carrier and a shipper in the transport of goods, the computer program product comprising:

computer code that creates at least one carrier account in a database on a central data server, the created carrier account having an associated private carrier data set and a non-private carrier data set, where the non-private carrier data set contains records for data that the carrier agrees to share, the created carrier account having at least one record in the non-private carrier data set containing a shipper ID code for uniquely identifying the shipper to the carrier;

computer code that creates at least one shipper account in the database on the central data server, the created shipper account having an associated private shipper data set and a non-private shipper data set, where the non-private shipper data set contains records for data that the shipper agrees to share, the created shipper account having at least one record in the non-private shipper data set containing a carrier ID code for uniquely identifying the carrier to the shipper;

computer code that creates a link code in a record of the created carrier account or the created shipper account;

computer code that requests a network link between the shipper or carrier to the central data server by submitting the link code along with the carrier ID or shipper ID, the requesting enabling records in the created carrier account containing the shipper ID to be linked to the created shipper account and records in the created shipper account containing the carrier ID to be linked to the created carrier account;

computer code that establishes, over the network, an interactive communications link between the shipper or carrier to the central data server for sharing and updating linked records in the non-private carrier data set and the non-private shipper data set substantially eliminating duplicate records;

computer code that communicates at least a portion of the linked records through the communications link where updates made to the linked records by the shipper or carrier are stored in the database; and a computer-readable medium that stores the computer code.

31. The computer program product recited in claim 30, further comprising computer code that establishes at least one data sharing partner in the at least one carrier account, wherein data sharing partner is the shipper for which the carrier has agreed to share data with.

32. The computer program product recited in claim 30, further comprising computer code that establishes at least one data sharing partner in the at least one shipper account, wherein the data sharing partner is the carrier for which the shipper has agreed to share data with.

33. The computer program product recited in claim 30, further comprising computer code that enables the maintenance of records in linked records for loads in the process of being transported.

34. The computer program product recited in claim 30, further comprising computer code that enables the creating a load record in linked records, the load record being associated with a load.

35. The computer program product recited in claim 34, further comprising computer code that enables the shipper to assign the carrier to transport the load.

36. The computer program product recited in claim 34, further comprising computer code that enables the carrier to assign the shipper as the shipper of the load to facilitate linking of the records.

37. The computer program product recited in claim 34, further comprising computer code that enables, after delivery of the load, communication that the load was delivered by updating linked records.

38. The computer program product recited in claim 34, further comprising computer code that enables communicating reports on shipment, load, or carrier activity, wherein the shipment, load, or carrier activity reports are comprised in linked records.

39. A computer program product according to claim 30 wherein the computer-readable medium is one selected from the group consisting, a CD-ROM, a hard disk, a floppy disk, a tape drive, and semiconductor memory.

* * * * *